United States Patent
Meenakshisundaram et al.

(10) Patent No.: US 12,366,913 B2
(45) Date of Patent: *Jul. 22, 2025

(54) METHOD AND SYSTEM FOR DYNAMIC SELECTION OF APPLICATION DIALOG LAYOUT DESIGN

(71) Applicant: OPEN TEXT CORPORATION, Waterloo (CA)

(72) Inventors: Raman Meenakshisundaram, Bangalore (IN); Jeroen van Rotterdam, Berkeley, CA (US)

(73) Assignee: Open Text Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,787

(22) Filed: Oct. 11, 2023

(65) Prior Publication Data
US 2024/0036633 A1 Feb. 1, 2024

Related U.S. Application Data

(63) Continuation of application No. 17/322,823, filed on May 17, 2021, now Pat. No. 11,816,254, which is a (Continued)

(51) Int. Cl.
*G06F 3/01* (2006.01)
*G06F 3/048* (2013.01)
(Continued)

(52) U.S. Cl.
CPC ................ *G06F 3/01* (2013.01); *G06F 3/048* (2013.01); *G06F 3/0481* (2013.01); *G06F 9/451* (2018.02);
(Continued)

(58) Field of Classification Search
CPC .......... G06F 3/01; G06F 3/048; G06F 3/0481; G06F 9/451; G06F 11/3006; G06F 11/34; G06F 11/3438; G06F 11/3452; G06F 3/00
See application file for complete search history.

(56) References Cited

U.S. PATENT DOCUMENTS

2002/0156797 A1* 10/2002 Lee .................... G06Q 30/00
2005/0131934 A1* 6/2005 Gilbert ................ H04L 67/306
707/999.102
(Continued)

*Primary Examiner* — Jennifer N Welch
*Assistant Examiner* — Amy P Hoang
(74) *Attorney, Agent, or Firm* — Sprinkle IP Law Group

(57) ABSTRACT

This disclosure provides a system and method for selecting an application dialog layout design based on a response pattern for a task-based application. A plurality of user interface layouts may be generated based on a first user interface layout, where the first user interface layout is associated with a task included in a process of a computer-implemented software application. One or more performance metrics associated with each user interface layout of the plurality of user interface layouts may be monitored, where the one or more performance metrics characterize a performance of the task by one or more task users. A second user interface layout may be selected based on an analysis of the one or more performance metrics. The second user interface layout may be provided to a plurality of users of a computer-implemented software application.

20 Claims, 7 Drawing Sheets

Related U.S. Application Data continuation of application No. 16/451,303, filed on Jun. 25, 2019, now Pat. No. 11,036,281, which is a continuation of application No. 15/701,127, filed on Sep. 11, 2017, now Pat. No. 10,372,201, which is a continuation of application No. 13/683,024, filed on Nov. 21, 2012, now Pat. No. 9,772,682.

(51) Int. Cl.

| | | |
|---|---|---|
| *G06F 3/0481* | (2022.01) | |
| *G06F 9/451* | (2018.01) | |
| *G06F 11/30* | (2006.01) | |
| *G06F 11/34* | (2006.01) | |
| *G06F 3/00* | (2006.01) | |

(52) U.S. Cl.
CPC .......... *G06F 11/3006* (2013.01); *G06F 11/34* (2013.01); *G06F 11/3438* (2013.01); *G06F 11/3452* (2013.01); *G06F 3/00* (2013.01)

(56) References Cited

U.S. PATENT DOCUMENTS

| | | | | |
|---|---|---|---|---|
| 2007/0300185 A1* | 12/2007 | Macbeth | ................ | G06F 9/451 715/764 |
| 2013/0212487 A1* | 8/2013 | Cote | ..................... | G06F 9/451 715/745 |

* cited by examiner

METHOD AND SYSTEM FOR DYNAMIC SELECTION OF APPLICATION DIALOG LAYOUT DESIGN

CROSS-REFERENCE TO RELATED APPLICATIONS

This application is a continuation of, and claims a benefit of priority under 35 U.S.C. § 120 of the filing date of U.S. patent application Ser. No. 17/322,823, filed May 17, 2021, issued as U.S. Pat. No. 11,816,254, entitled "METHOD AND SYSTEM FOR DYNAMIC SELECTION OF APPLICATION DIALOG LAYOUT DESIGN," which is a continuation of, and claims a benefit of priority under 35 U.S.C. § 120 of the filing date of U.S. patent application Ser. No. 16/451,303, filed Jun. 25, 2019, issued as U.S. Pat. No. 11,036,281, entitled "METHOD AND SYSTEM FOR DYNAMIC SELECTION OF APPLICATION DIALOG LAYOUT DESIGN," which is a continuation of, and claims a benefit of priority under 35 U.S.C. § 120 of the filing date of U.S. patent application Ser. No. 15/701,127, filed Sep. 11, 2017, issued as U.S. Pat. No. 10,372,201, entitled "METHOD AND SYSTEM FOR DYNAMIC SELECTION OF APPLICATION DIALOG LAYOUT DESIGN," which is a continuation, and claims a benefit of priority under 35 U.S.C. § 120, of U.S. patent application Ser. No. 13/683,024, filed Nov. 21, 2012, issued as U.S. Pat. No. 9,772,682, entitled "METHOD AND SYSTEM FOR DYNAMIC SELECTION OF APPLICATION DIALOG LAYOUT DESIGN." All applications referenced in this paragraph are hereby expressly incorporated by reference for all purposes.

BACKGROUND

The present disclosure relates to the field of information technology, including, more particularly, to systems and techniques for dialog layout design.

Large organizations, such as businesses, often use one or more computer programs, such as enterprise applications, during the course of their activities. An enterprise application may be enterprise software that is used to offer services from a cloud-based environment. Thus, employees of an organization may use an enterprise application for a particular service, such as a business-oriented tool, that enables the organization to perform business activities.

Conventional enterprise applications are limited because end-users, such as employees of an organization or a business, may be presented with static user interface (UI) screens in which the screen layout and the controls/widgets presented in the screen are fixed. Thus, the layout of the screen cannot be changed to optimize the end-user's experience.

DETAILED DESCRIPTION

Figure 1:
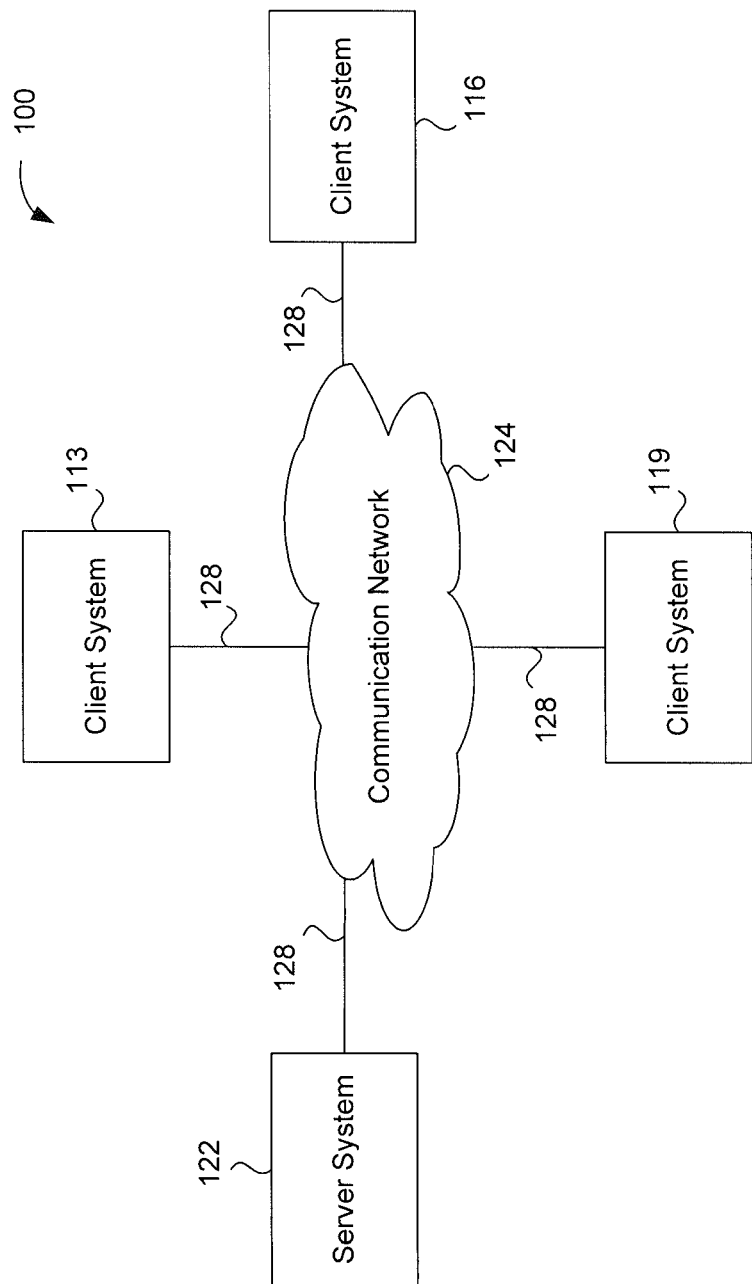
FIG. 1 shows a block diagram of a client-server system and network, implemented in accordance with an exemplary embodiment.

An organization, such as a business, may use a cloud-based software application, such as an enterprise application, during the course of its activities, such as providing business services or goods to customers. In various implementations, an employee of the organization may use the enterprise application to perform a process that may be a part of his or her employment. For example, a loan agent may be employed by a bank to review loan applications and approve loans. The loan agent may use the enterprise application to manage information about applicants and approve or deny applications. The process may include various tasks that the user completes. For example, one task may be to enter information about a new applicant into a database system. To enable a user to complete a task, the enterprise application may present the user with one or more dialogs during the process. In various implementations, a dialog may be a window or dialog box that is configured to display information to a user, such as a task user, and/or receive an input from the user via a user interface. The dialog may include various user interface components, such as application-defined message text, a title, icons, widgets, controls, and any combination of buttons. The dialog may have a layout that defines a visual, spatial, and functional relationship between the user interface components, as well as determines which user interface components are included in the dialog. In various implementations, the user may use the user interface components to perform a task. Returning to the previous example, the loan agent may enter information into text boxes included in a dialog and click a button that saves the information to the bank's database system.

Conventional systems and methods present users with dialogs that have static layouts. Thus, controls and widgets within a dialog presented by an enterprise application are substantially fixed and cannot be changed without offline modifications to the enterprise application and significant downtime. Accordingly, if a particular dialog layout is inefficient or cumbersome and should be optimized, the application must be taken offline to change the layout to implement a new one. Moreover, developers of the enterprise application software are not provided with real-time feedback about the end-user's experience. Instead, the software developers analyze collected data and after the user has finished using the application. Furthermore, conventional methods do not provide feedback about the end-user's experience automatically. Instead a user may provide manual feedback, such as completing a survey, which is later reviewed by the software developer. Moreover, such manual processes are time consuming and do not provide comprehensive or accurate information about the end-user's experience.

In various implementations, systems and methods are provided to dynamically render content provided by an application, such as an enterprise application. Thus, layouts of dialogs presented by an enterprise application may be changed dynamically and in real-time. Moreover, a software developer or automatic process may receive feedback, in real-time, about an end-user's experience with a dialog layout. Thus, if a dialog layout is inefficient or should be optimized, a new optimal layout may be dynamically rendered and provided to users of the enterprise application. Accordingly, the layout and/or user interface components included in the layout may be dynamically conditioned for a context and application associated with a group of users. In various implementations, one or more components of a system or apparatus may generate and monitor several dialog layouts for a targeted group of users. The effectiveness of each layout may be measured. In some implementations, the most effective layout may be chosen and provided to all users.

Returning to a previous example, the bank may employ multiple loan agents to review loan applications. In various implementations, a software developer may decide to optimize the task of entering information into the bank's database. A system as described herein may generate different dialog layouts for the task that is currently being performed (i.e., the task of entering information). The task users (in this case the loan agents) may be divided into groups. Each dialog layout may be sent to one group of loan agents. The system may measure a performance characteristic indicative of efficiency or quality of each dialog layout, such as how long each group takes to enter information for an applicant. The system may choose the dialog layout that resulted in the best performance as an optimal dialog layout. In this example, the dialog layout that took the least amount of time may be selected as the optimal dialog layout. Accordingly, the optimal dialog layout may be provided to all users. This may be done dynamically and in real-time without any downtime of the enterprise application. Furthermore, the system may provide the software developer with a report that includes detailed statistics that may be more comprehensive than those provided by a manual survey.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as a client or a server, depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
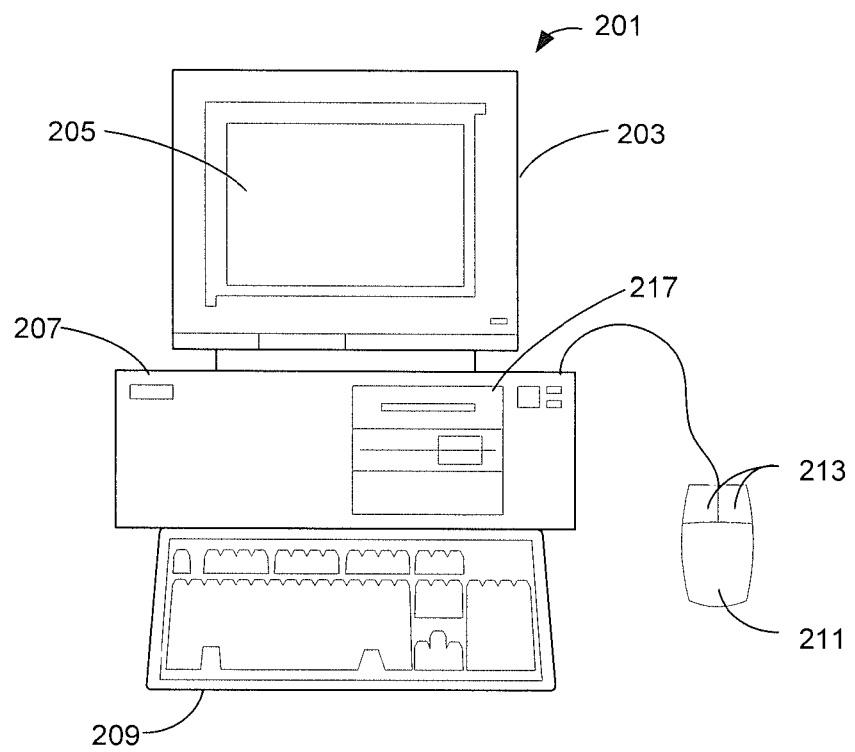
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media.

Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
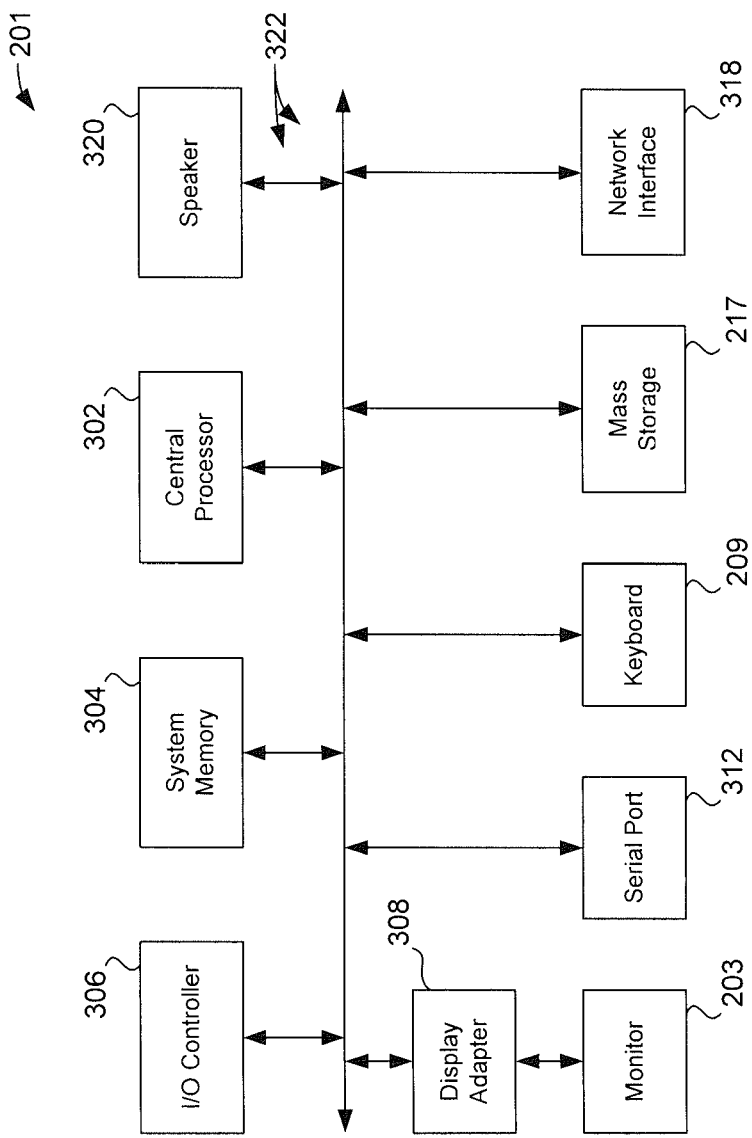
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C #, Pascal, Fortran, Perl, MATLAB® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
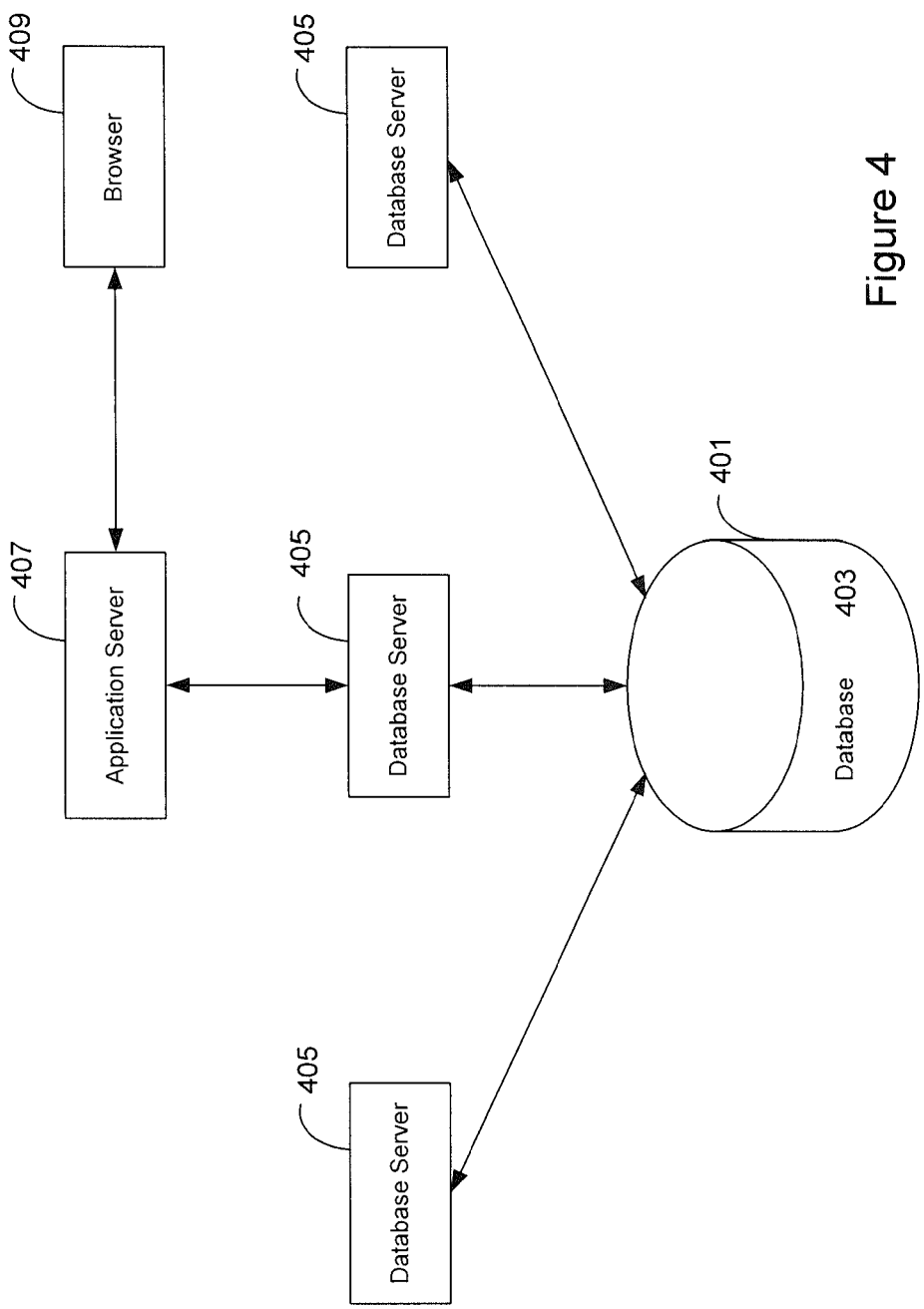
FIG. 4 shows a data source or data service in the form of a database system, implemented in accordance with an exemplary embodiment.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by—one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
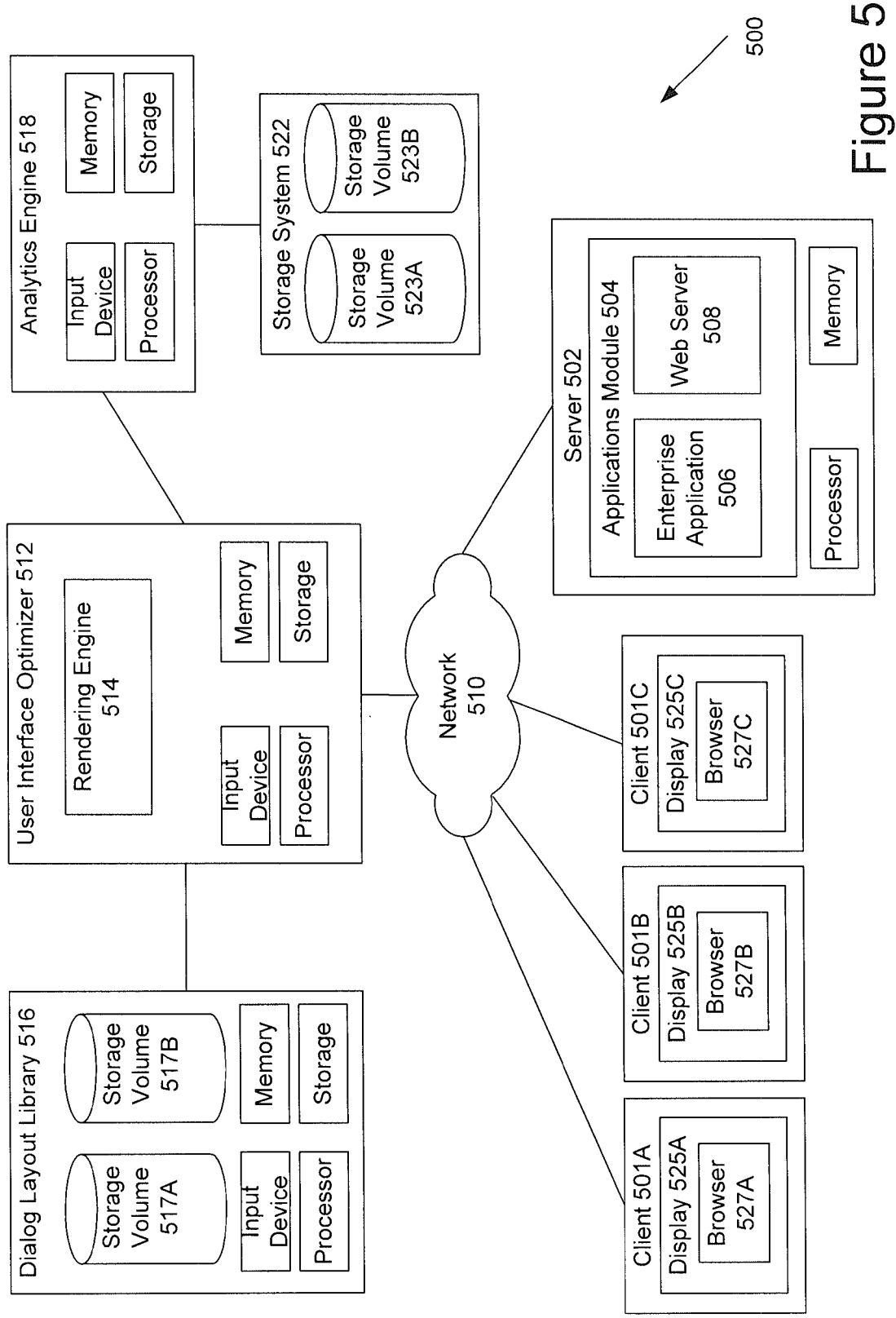
FIG. 5 shows a block diagram of an example of a system 500 for selecting a dialog layout, implemented in accordance with an exemplary embodiment.

FIG. 5 shows a block diagram of an example of a system 500 for selecting a dialog layout, implemented in accordance with some implementations. In various implementations, system 500 may handle a request to optimize a dialog layout of a software application, such as an enterprise application. In some implementations, system 500 may include server 502, applications module 504, enterprise application 506, web server 508, network 510, user interface optimizer 512, rendering engine 514, dialog library 516, storage volume 517A, storage volume 517B, analytics engine 518, storage device 522, storage volume 523A, and storage volume 523B. Moreover, system 500 may include any number of clients such as first, second, and third clients 501A, 501B, and 501C which access server 502 via network 510.

The clients are computers with hardware and software, such as shown in FIGS. 1 and 3 described above. For example, the first client includes a first display 525A, a first application program (e.g., first browser program) 527A, an input device, a processor, memory, and storage. Similarly, the second client includes a second display 525B, a second application program (e.g., second browser program) 527B, an input device, a processor, memory, and storage. The third client includes a third display 525C, a third application program (e.g., third browser program) 527C, an input device, a processor, memory, and storage.

FIG. 5 shows three clients. It should be appreciated that an enterprise can have any number of clients such as tens, hundreds, or thousands of clients. The clients execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer or computer tablet.

In various implementations, system 500 may include server 502. The server includes components similar to the components described in FIGS. 1 and 4. In some implementations, server 502 may include hardware and software used to run one or more services to serve the needs of other computers and users on network 510. Thus, server 502 may include one or more processors and memory capable of executing software operations and serving webpages. It will be appreciated that in some implementations, server 502 may comprise several servers in a distributed or cloud computing network.

In various implementations, server 502 may include an applications module, such as applications module 504. In some implementations, applications module 504 includes software and hardware that may be used to execute one or more software applications. Thus, applications module may include software and/or firmware instructions that configure the functionality of server 502.

According to various implementations, applications module 504 includes enterprise application 506. In particular implementations, enterprise application 506 may include software instructions that, when executed by one or more processors, execute one or more processes associated with an enterprise application. Thus, enterprise application 506 may include software instructions that configure one or more tasks performed by a user when the user is performing a process of the enterprise application.

In various implementations, applications module 504 may include an application used to serve webpages, such as web server 508. In some implementations, web server 508 serves web pages to a client machine operated by a user of the enterprise application. Thus, according to various implementations, an application such as a web server 508 may deliver webpages and other content from a storage volume of server 502 to the browsers of the client machines. Thus, according to various implementations, an enterprise application may be accessible to a client machine over the network using the browser. For example, first, second, and third users at clients 501A-501C, respectively, login by using a browser to access the application. The application may require that the user input a username and a password so that the user can be authenticated. The users may be employees, colleagues, partners, or members of the same company, organization, entity, partnership, joint venture, or have a business relationship (e.g., supplier-manufacturer relationship, or client-vendor relationship), and so forth.

In various implementations, system 500 may include user interface (UI) optimizer 512. In some implementations, UI optimizer 512 may be configured to handle requests to optimize a dialog layout for one or more dialogs in a process of an enterprise application. Thus, UI optimizer 512 may communicate with other entities, such as a client machine or server 502, via network 510 and receive a request to optimize a dialog layout. UI optimizer 512 may handle the request by communicating with other components of system 500 that may be coupled to a network, such as analytics engine 518 and dialog layout library 516. UI optimizer may return a result or response to the request via network 510.

In various implementations, UI optimizer 512 may include a rendering engine, such as rendering engine 514. In various implementations, rendering engine 514 may be configured to render a data object into a rendered data object capable of being displayed in a display device of a client machine. For example, rendering engine 514 may render an intermediate data structure into hypertext markup language (HTML) capable of being displayed by a web browser. Thus, according to various implementations, rendering engine 514 may be configured to render a dialog layout into a dialog that may be displayed in a web browser of a client machine, mobile phone, laptop computer or computer tablet.

In various implementations, system 500 may include dialog layout library 516. In some implementations, dialog layout library 516 may include one or more storage volumes, such as storage volume 517A and 517B. In particular implementations, dialog layout library 516 may be configured to store information associated with various dialog layouts, such as content that may be displayed in the dialog layouts. For example, dialog layout library 516 may store one or more data values identifying the content of a text box or the appearance and function of a control. Thus, dialog layout library 516 may provide a repository for information and content associated with various different dialog layouts that may be used at various different stages of the methods described herein.

In various implementations, system 500 may include analytics engine 518. In some implementations, analytics engine 518 may be configured to dynamically analyze responses from users of the enterprise application and select one or more dialog layouts to be provided to the users. Thus, analytics engine 518 may be configured to track input received from users and other components of system 500, and may be further configured to make one or more decisions based on that tracked information.

In various implementations, analytics engine 518 may be configured to store data and metadata related to decisions that have been made, and data that was used to make them. Thus, according to some implementations, system 500 may include storage system 522, where storage system 522 may be coupled to analytics engine 518. In various implementations, storage system 522 may include one or more storage volumes, such as storage volume 523A and storage volume 523B. In particular implementations, storage system 522 may store information generated by analytics engine 518 and used by analytics engine 518. Thus, one or more data values identifying decisions made by and metrics measured by analytics engine 518 may be stored in storage system 522.

Figure 6:
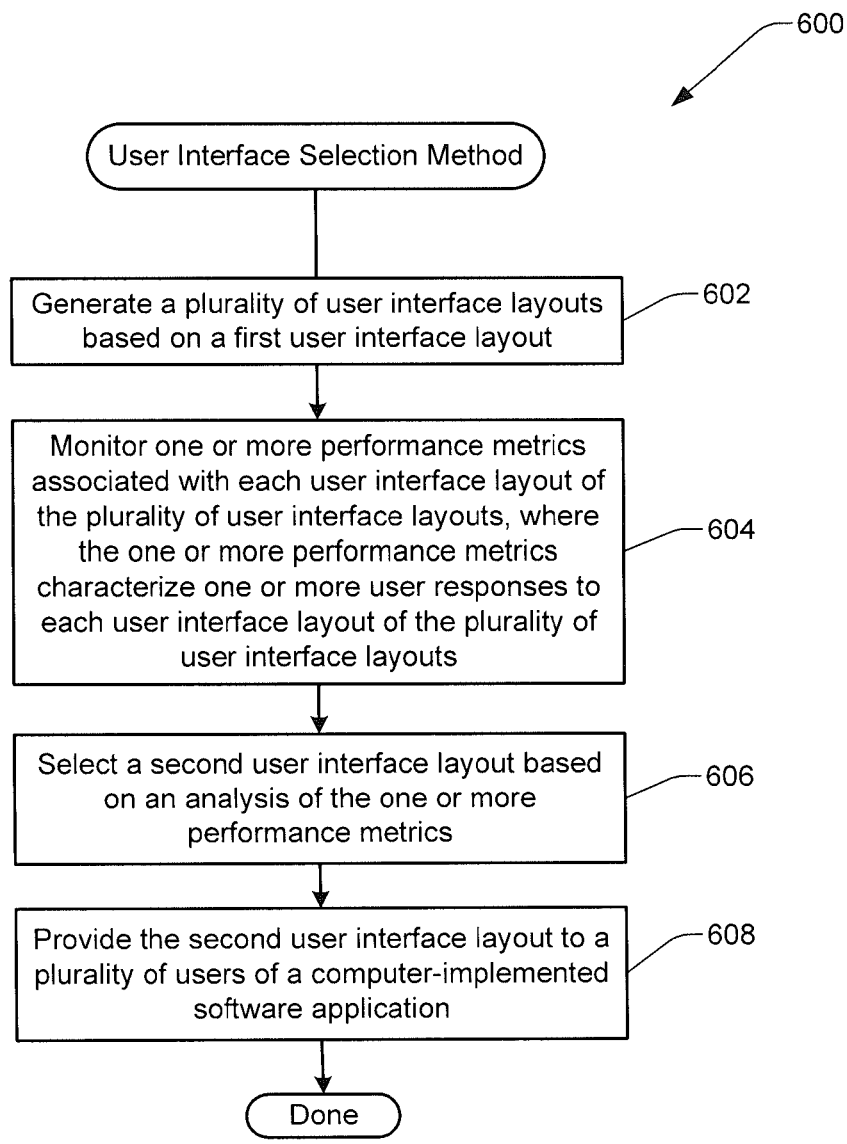
FIG. 6 shows a flowchart of an example of a method 600 for selecting a user interface layout, performed in accordance with an exemplary embodiment.

FIG. 6 shows a flowchart of an example of a method 600 for selecting a user interface layout, performed in accordance with some implementations. In various implementations, method 600 may dynamically render user interface layouts to identify and implement an optimal user interface layout for a particular group of task users based on their context in a process. In various implementations, the optimal user interface layout may be identified based on a path taken by one or more task users within a process to arrive at a particular user interface layout, and a path taken after performing one or more actions on the user interface layout. Accordingly, method 600 may generate several variations of a particular user interface layout that should be optimized. Method 600 may then record various data that describes how each variation performs within the task users' context. Method 600 may then select the user interface layout that performs the best as an optimal user interface layout.

Accordingly, at step 602, a plurality of user interface layouts may be generated based on a first user interface layout. In various implementations, a task user may be using the first user interface layout while performing a task that is part of an enterprise application process. In some implementations, a software developer or an automated process may determine that the process should be optimized and that a particular task within the process should be performed optimally. Accordingly, a component of a system as described herein, such as analytics engine 518 described in FIG. 5, may generate several variations of the user interface layout to determine which one performs optimally in the task users' context. In some implementations, each variation of the user interface layout may have a different arrangement or configuration of user interface components. However, the content among variations may remain the same. Thus, the same user interface components may be included in each variation. However, their arrangement may be different. In various implementations, one or more different user interface components may be included in each of the variations. Thus, each variation of the user interface layout may have a different arrangement or configuration of user interface components as well as different content within the user interface layout.

At step 604, one or more performance metrics associated with each user interface layout of the plurality of user interface layouts may be monitored. In various implementations, the one or more performance metrics characterize one or more task user responses to each user interface layout of the plurality of user interface layouts, and further characterize one or more task users' performances of a task within a process of the enterprise application. Thus, task users' interactions with the layouts may be monitored. Furthermore, actions taken by the task users prior to and after interacting with the layouts may also be monitored. Various quantitative and qualitative data about the performance of each variation of the user interface layout may be recorded in a storage system.

At step 606, a second user interface layout may be selected based on an analysis of the one or more performance metrics. In various implementations, recorded information describing tasks performed on the variations of the layouts may be analyzed. As discussed with reference to step 604, the information may describe each variations respective performance when being used by task users of the enterprise application in a particular context. In some implementations, a component of a system as described herein, such as analytics engine 518 described in FIG. 5, may apply one or more rules and perform one or more mathematical calculations to compare metrics measured for each variation, and to determine which variation performed optimally within the task users' context. Once, the optimal variation has been identified, it may be selected as the user interface layout that should be used for future iterations of its associated task in the enterprise application process.

At step 608, the second user interface layout may be provided to a plurality of task users of a computer-implemented software application. Thus, according to various implementations, the optimal user interface layout is provided to a group of task users that may be using the user interface for the particular task in the enterprise application process. Because method 600 may be performed dynamically and in real-time, the task users will now be using a layout which performs optimally for that particular group of task users in their current context. If the group of task users changes, or their context changes, method 600 may be repeated to reoptimize the layout of the user interface.

Figure 7:
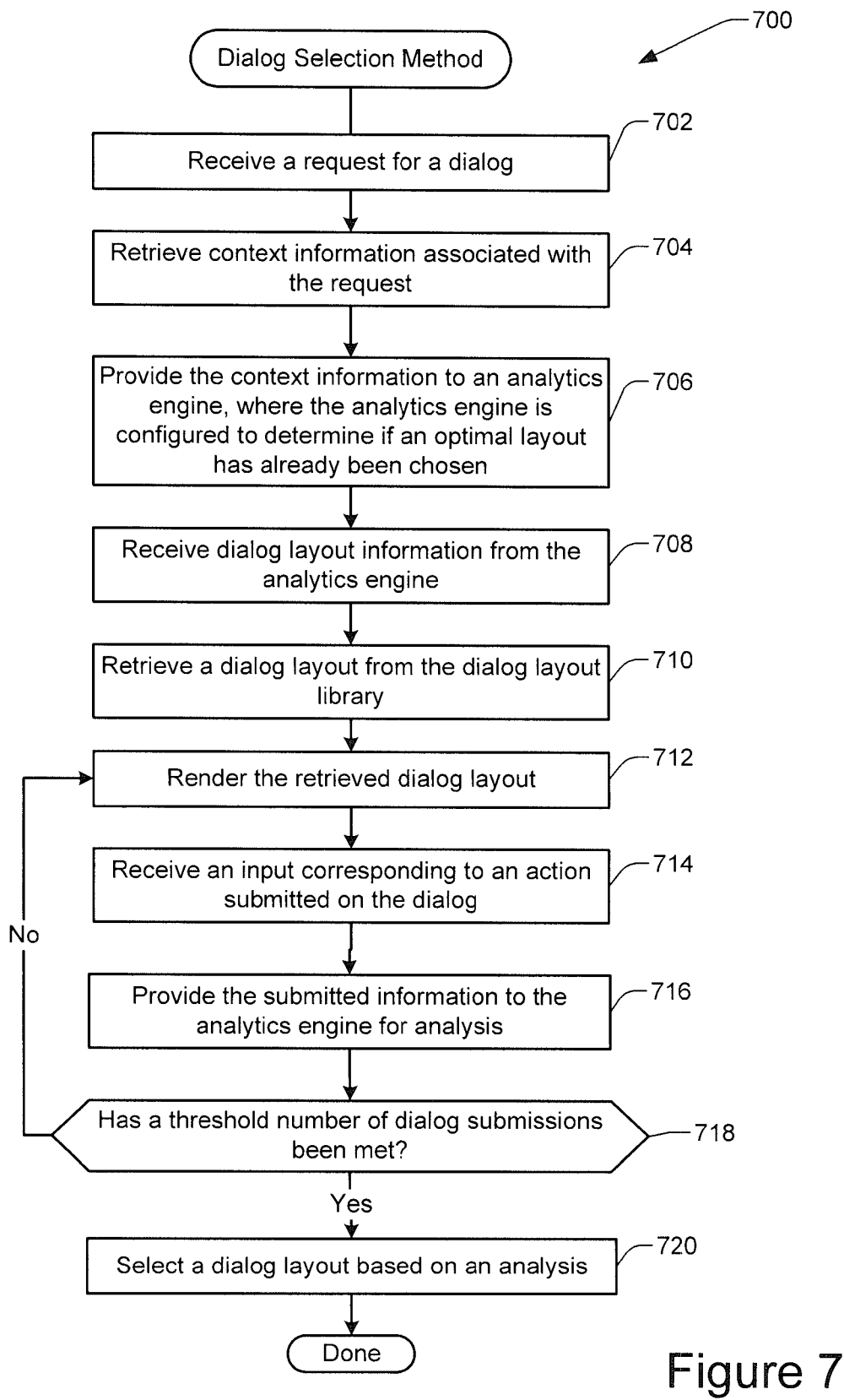
FIG. 7 shows a flowchart of an example of a method 700 for selecting a dialog layout, performed in accordance with an exemplary embodiment.

FIG. 7 shows a flowchart of an example of a method 700 for selecting a dialog layout, performed in accordance with some implementations. In various implementations, method 700 may receive a request to optimize a dialog layout of an application, determine if an optimal dialog layout has already been generated. If no optimal dialog layout exists, method 700 may generate several dialog layouts and perform an analysis of the generated dialog layouts to identify an optimal dialog layout for a task user's context. Moreover, method 700 may optimize the dialog layout dynamically, automatically, and in real-time. Thus, dialog layouts used by task users, such as members or employees of an enterprise performing a task within a process of an enterprise application, may be optimized as the users continue to use the enterprise application, as different users enter the group, and as the users' context changes. This may be done without downtime that may otherwise be caused by modifying the programming of the enterprise application.

Accordingly, at step 702, a request for optimization of a dialog layout may be received. As previously discussed, it may be desirable to optimize a process including one or more dialogs used by an application, such as an enterprise application. For example, an enterprise may have a call service center responsible for handling calls from customers. The enterprise may use an enterprise application that implements a predetermined process for handling a customer call. The process may comprise several tasks, such as creating a new file for the customer, creating a new record for the customer's case, and reading an appropriate script for responding to the customer's inquiry. In some implementations, each of these tasks may have an associated dialog, such as a dialog box that may display text information on a display screen and/or receive text input by the user into a computer machine. For example, for the task of reading a script, a dialog box may be presented to the user that includes a text box with a predetermined script that should be read to the customer by the user. In various implementations, a request to optimize the dialog box may be issued so that the user takes as little time as possible to access and read the script to the customer.

In various implementations, the request may be a message that includes one or more data values identifying the dialog layout that should be optimized, and further identifying a task user using the dialog layout. Returning to the previous example, the task user may be the customer service agent that has received a call from a customer. In this instance, the message may include a first unique identifier that identifies the dialog layout and a second unique identifier that identifies the task user. In various implementations, the relevant information, such as the identifiers, may be collected by a server, such as server 502, and included in a message. The message may be sent from the server to a UI optimizer, such as UI optimizer 512.

According to some implementations, one or more components associated with the enterprise application may issue the request to optimize the dialog layout. For example, a request to optimize the dialog layout may be issued by one or more automated processes associated with the enterprise application, such as an automatic process executed by server 502. In various implementations, the automated process may periodically issue requests to optimize dialogs, or may issue a request in response to detecting an event. For example, the automated process may detect a particular task in a process taking longer than a threshold period of time. If a task is taking longer than a previously determined threshold value, the automated process may issue a request to optimize the dialog for that particular task. In some implementations, the request may be issued by a system administrator or a software developer. Thus, a system administrator or a software developer may be monitoring the performance of the enterprise application and determine that one or more dialog layouts should be optimized.

At step 704, context information associated with the request may be retrieved. According to some implementations, the UI optimizer may retrieve the context information in response to receiving the request and based on the task worker's unique identifier. In some implementations, context information may be information that describes which user interface components should be included in a dialog layout based on a task user's context. More specifically, according to various implementations, the context information may include information that identifies the task user's current state in a process. In various implementations, the task user's current state may refer to a state that identifies the task user's progress or location in a predetermined series of steps or tasks that comprises a process. Returning to the previous example, if the process of handling a customer call includes four steps, and the request to optimize a dialog layout was issued for the dialog for the third step, the task user's current state may be identified as the third step of a process comprised of four steps.

In some implementations, the context information may additionally include historical information that describes a path taken by the user to arrive at the current state of the task user's process. Thus, the context information may include one or more data values identifying what actions a task user has taken and what data objects the task user may have accessed up until the point in time at which the request was issued. Thus, if the task user is performing tasks in a branching process, historical information may be collected that tracks which path the task user has taken and which actions the task user took to arrive at the current state. Returning to the previous example, if the task user is currently at a third step in a process, historical information may identify the first and second steps in the process. Furthermore, the historical information may track user interface components that were accessed or modified by the user in each of the preceding steps.

In various implementations, the context information is logged and archived by one or more servers executing the enterprise application. For example, server 502 may log and archive context information for one or more task users in a memory, such as a non-volatile computer-readable storage medium. Moreover, because the server may store and execute the enterprise application software, the server may have access to information identifying the overall structure of one or more processes associated with the enterprise application. For example, the server may determine that the task user's current state is step three out of a total of four steps based on a total number of steps and a relationship between the steps that are identified by the original programming of the software of the enterprise application.

According to various implementations, the context information may be retrieved by the UI optimizer from one or more storage devices of a server, such as server 502. Thus, according to various implementations, the UI optimizer may query the memory of one or more servers executing the enterprise application to identify and retrieve the context information.

At step 706, the context information may be provided to the analytics engine. Thus, according to various implementations, the UI optimizer may include the context information in a message and send the message to the analytics engine for analysis.

At step 708, dialog layout information may be received from the analytics engine. Thus, according to various implementations, the analytics engine may receive the context information provided at step 706, determine which dialog layout information should be returned to the UI optimizer, and send the appropriate dialog layout information to the UI optimizer. In various implementations, dialog layout information may be one or more data values capable of identifying a configuration of user interface components included in a dialog layout. Thus, the dialog layout information may define locations of user interface components within a dialog, and relationships between user interface components included in the dialog.

In various implementations, before sending the dialog layout information to the UI optimizer, the analytics engine may first determine which dialog layout information should be returned. In various implementations, if an optimal dialog layout has already been selected, the analytics engine may return the same dialog layout information that is currently being used. In some implementations, if an optimal dialog layout has not been selected, the analytics engine may generate several variations of the dialog layout that is currently being used.

In various implementations, the analytics engine may make this determination based on information stored in a storage system, such as storage system 522. For example, the analytics engine may have previously determined an optimal dialog layout for the dialog associated with the request. In some implementations, this may have occurred in response to a previous request. For example, the storage system may store in a data table unique identifiers of all dialog layouts that have been optimized. The analytics engine may check the unique identifier for the dialog associated with the request against unique identifiers stored in the data table. If a match for the dialog's unique identifier is found in the data table, the analytics engine may determine that the dialog has already been optimized, and may return dialog layout information identifying a configuration for the existing dialog layout.

In various implementations, if an optimal dialog layout has not been chosen, the analytics engine may generate multiple configurations of dialog layouts that may be tested to determine an optimal dialog layout. In some implementations the analytics engine may identify user interface components that are included in each generated dialog layout based on the user's context information. Thus, according to some implementations, information identifying which task a user is performing may be used to identify which user interface components should be included. For example, the original program instructions for the enterprise application may indicate that a particular four user interface components are included in a dialog for a particular task of the enterprise application process. The analytics engine may determine that those particular four user interface components are included in the dialog layout based on context information indicating that the task user is performing that particular task, and based on the original program of the enterprise application that identifies those four user interface components.

Moreover, information identifying previous actions taken by a user, such as accessing a particular user interface component, may be used to identify user interface components to include in the generated dialog layout. For example, a user may access a supporting widget while performing a task. In various implementations, a supporting widget may be user interface component that was accessed by the task user, but is not included in the existing dialog layout for which the request for optimization was made. Thus, if a task user uses a supporting widget more than a predetermined number of times for a particular task, the supporting widget may be included in the dialog layout. Similarly, unused widgets or user interface components may be removed from the dialog layout.

In some implementations, the presentation of the user interface components may be randomized. Thus, the configuration, arrangement, and content of the user interface components may be determined randomly. In this way, several variations of a dialog layout may be generated. As discussed in greater detail below, one variation may be returned to the task user associated with the request received at step 702. The other variations may be provided to other users who may be performing the same task.

In various implementations, the dialog layout may be determined based on a predetermined mapping scheme. In some implementations, if some user interface components were used more frequently than others, they may be assigned a position in the dialog layout that may be more accessible by a task user. For example, the user interface component that was used the most times may be positioned in the top left corner of the dialog layout. Likewise, the second most used user interface component may be positioned immediately to the right of the most used user interface component. In this way, a mapping scheme may be used to assign a location to a user interface component based on any available context information or metrics, as discussed in greater detail below.

In various implementations, the analytics engine may be configured to generate one or more unique identifiers that may be associated with each returned dialog layout. In various implementations, the unique identifier may include one or more data values including a unique string of text or numbers. In some implementations, the analytics engine may log information associated with the unique identifier in a storage system, such as storage system 522. For example, the analytics engine may store one or more data values identifying the dialog layout, the task user associated with the dialog layout for a particular request, and a timestamp identifying when the request was made. Thus, the analytics engine may use the unique identifier to track requests and submissions associated with a dialog layout and a task user. As stated above, according to various implementations, the information may be stored in one or more storage volumes of a storage system, such as storage volume 523A and storage volume 523B of storage system 522.

Once the analytics engine has determined which dialog layout information to return to the UI optimizer and created a unique identifier, the analytics engine may include the dialog layout information and unique identifier in a message and send the message sent to the UI optimizer.

At step 710, the UI optimizer may retrieve a dialog layout from a dialog library. In various implementations, the dialog layout library may return a dialog layout based on the dialog layout information that was provided by the UI optimizer. In various implementations, the dialog layout information provided by the UI optimizer may be the same dialog layout information that was received from the analytics engine at step 708. For example, the UI optimizer may issue a request to retrieve the dialog layout from the dialog layout library. In various implementations, the request may include the dialog layout information. The dialog layout library may receive the request, and return the requested dialog layout to the UI optimizer based on the dialog layout information.

According to various implementations, the dialog layout library may identify one or more dialog layouts based on the dialog layout information. Once identified, the dialog layout library may retrieve the identified dialog layout and return the identified dialog layout to the UI optimizer. In various implementations, retrieving the dialog layout may include retrieving content associated with user interface components identified by the dialog layout information. As previously discussed, dialog layout information may identify a configuration of user interface components in a dialog. However, the dialog layout information might not include the content of the respective user interface components. For example, dialog layout information may indicate that a particular text box should be included in a dialog. However, the dialog layout information might not include the content of the text box. Thus, the content of the text box may be retrieved from the dialog library.

At step 712, the UI optimizer may render the retrieved dialog layout. In various implementations, the UI optimizer includes a rendering engine that may be capable of rendering a dialog layout into an image capable of being displayed on a display device of a computer system. For example, the rendering engine may render the dialog layout into hypertext markup language (HTML) that may be displayed in a web browser. The rendered dialog layout may then be provided to a client machine for display to the task user. In various implementations, the unique identifier may be sent to the client machine along with the rendered dialog layout. In some implementations, the unique identifier is set as a hidden parameter. Thus, the user might not see or be aware of the unique identifier. However, the unique identifier may still be used to track the user's actions.

At step 714, an input may be received. In various implementations, the input may be an input provided by a task user when interacting with the rendered dialog layout that was provided to the client machine. In some implementations, the input may be the result of an action submitted by the task user when performing a task that involves the rendered dialog layout. In various implementations, the input may be received by a client machine used by the task user. In various implementations, the client machine may use the unique identifier associated with the task user to track activity associated with the task user, such as actions taken by the task user. The tracked information may be sent to a server, such as server 502, to provide a detailed accounting of the user's activities. The server may include the information in a message and send the message to the UI optimizer. Thus, according to various implementations, the UI optimizer may receive information associated with the input that includes one or more data values identifying the dialog layout on which the action was submitted, the task user that submitted the action, the action taken by the user, and the previously generated unique identifier.

For example, a sales agent may be responsible for calling potential customers to inform them of potential sales opportunities. The sales agent's organization may use an enterprise application that provides a process for soliciting new customers. One of the tasks within the process may be to read a pre-defined script to the potential customer. Thus, a rendered dialog window may be presented to a sales agent during this task. The dialog may include a user interface component, such as a text box, that displays a script. After calling the potential customer, the sales agent may read the script to the potential customer and close the dialog. In this instance, the action of closing the dialog window may be received as an input. The client machine used by the sales agent may receive the input and provide information identifying the task user, the action, and the dialog layout to a server and/or to the UI optimizer.

At step 716, the information describing the task user's submission may be provided to the analytics engine for analysis. In some implementations, the UI optimizer may send the information to the analytics engine in a message. In various implementations, the analytics engine may record all information received. Thus, the analytics engine may keep a record of activity associated with a dialog in a storage system. Moreover, the analytics engine may store information detailing actions taken by the task user. Thus, if information identifying actions taken by the task user was collected by the client machine and provided to the UI optimizer, that information may be received by the analytics engine and stored in a storage system. Thus, according to some implementations, the analytics engine may log and store information describing the occurrence of one or more events involving the unique identifier and its associated dialog. In one example, the information may be a timestamp indicating when one or more actions submitted to the dialog were made.

At step 718, the analytics engine may determine whether or not a threshold number of dialog submissions has been met. As previously discussed, multiple task users may be using the enterprise application and dialogs for each step of its processes. Thus, multiple task users may use and submit actions for a particular variation of a dialog layout. The analytics engine may monitor and track information associated with each of the variations. According to various implementations, the analytics engine may track a total number of submissions, such as actions submitted by a task user, to determine whether or not a threshold number of submissions has been met for a particular dialog layout.

Returning to a previous example, multiple sales agents may work for a sales organization and use an enterprise application. As previously discussed, the sales agents may submit actions on dialogs during a process executed by the enterprise application. In this instance, the analytics engine may determine if a sufficient number of submissions have been submitted for a particular dialog. Thus, if 100 sales agents have been provided with a dialog layout, and 75 of the sales agents have completed reading a script to a potential customer and closed the dialog, the analytics engine may compare the number 75 with a threshold value. In this example, a software developer may have previously determined that a minimum of 70 submissions are required. Thus, in this instance, the number of threshold submissions has been met, and the analytics engine may proceed to analyze the performance of the sales agents to select an optimal dialog layout.

In various implementations, the threshold number may be determined based on the total number of task workers who use the enterprise application. For example, the threshold number may be a multiple of the total number of task workers. If the total number of task users is 200, the threshold number may be 400 or 600 submissions for a particular dialog. It will be appreciated that higher or larger threshold numbers may result in more accurate and effective optimal dialog layout selection.

In various implementations, if the threshold number has not been met, method 700 may return to step 712. In some implementations, the analytics engine may wait until additional iterations and submissions have been completed and the threshold number has been met.

Returning to step 718, if the threshold number of submissions for the dialog layout has been met, method 700 may proceed to step 720. At step 720, the analytics engine may analyze one or more metrics associated with the dialog layout and its associated process to determine whether or not the dialog layout is the best layout for that particular dialog. In some implementations, the analytics engine may calculate a measure, such as an average, for each variation of a dialog layout based on the metrics for each layout. The analytics engine may then compare the calculated measures and select the variation of the dialog layout that has the best measure In various implementations, the analytics engine may analyze metrics derived from context information to select an optimal dialog layout. Thus, the analytics engine may analyze information describing a path taken by a task user during a process during which one or more variations of the dialog layout were used. As previously discussed, examples of context information may include a task user's current state, previous tasks completed by a task user, and user interface components that the task user accessed or did not access. In some implementations, the analytics engine may calculate a measure for each variation based on the context information. For example, the analytics engine may calculate an average number of steps or tasks performed by task users during a process that includes the dialog layout. The analytics engine may select the variation of the dialog layout that took the lowest number of steps on average. Returning to a previous example, if a loan agent is performing a process of reviewing a loan application, the process may include a dialog that allows the loan agent to perform a task that is part of the process of reviewing the loan application. In this instance, the dialog may be a dialog box that enables the loan agent to enter information into a bank's database system. Context information may identify how many total steps task users using different variations of the dialog took to complete the process of reviewing a loan application. The analytics engine may select the variation of the dialog layout for the group of task users that took the fewest steps to review a loan application. It will be appreciated that a similar calculation may be made for any other type of context information, or any combination of types of context information.

In some implementations, the analytics engine may analyze time stamps associated with the variations of dialog layouts. In this example, each task user that submitted an action on each variation may have two associated time stamps. A first time stamp may identify when a task started (i.e. when the request of step 702 was made). The second time stamp may identify when a task was completed. This time stamp may, for example, be obtained from information that originally was logged by a client machine when the user closed the dialog. The analytics engine may compare the timestamps to determine how much total time was taken to perform the task. The analytics engine may perform this comparison for each task user. The analytics engine may average the times for each variation of the dialog layout to calculate an average time taken by a task user to perform a task using a particular variation of the dialog layout. The analytics engine may compare the averages for all variations of the dialog layout and select the variation of the dialog layout that has the lowest average time.

In some implementations, other metrics may be used. For example, the analytics engine may choose a variation of a dialog layout that used the fewest supporting user interface components, had the fewest user interface component accesses, or had the fewest subsequent tasks performed by task users. In various implementations, the analytics engine may use other metrics of quality. For example, the analytics engine may select a variation of a dialog layout that received the highest scores in a customer satisfaction survey or had the highest number of repeat customers. It will be appreciated that the analytics engine may select an optimal dialog layout based on more than one metric. One of skill in the art will appreciate that any combination of metrics may be used. In various implementations, the analytics engine may use an optimization function, such as a generic optimization function, to analyze the metrics and select a variation of a dialog layout. In some implementations, the optimization function may have been previously configured by a software developer to select an optimal dialog layout based on any of the previously described metrics.

In various implementations, the analytics engine may store the metrics, other data associated with the metrics, and the results of its analysis in a storage system. The analytics engine may then return dialog layout information for the selected dialog layout to the UI optimizer. As previously discussed, the UI optimizer may render the selected dialog layout and provide the rendered dialog to one or more task users.

Furthermore, according to some implementations, the analytics engine may generate a report that summarizes the results of its analysis. The report may include any information that may be associated with the analysis. For example, the report may include one or more data values identifying the dialog layout for which the request was issued, which metrics were used as the basis of optimization, and which dialog layout was selected. The report may be provided to a system administrator or a software developer in real-time. Thus, a software developer may be provided with reports and monitor the optimization process as a task user is performing a task.

In various implementations, the analytics engine may continuously monitor submissions on a dialog to continually monitor the efficiency of the dialog even after an optimal dialog layout has been selected at step 718. In some implementations, the analytics engine may continue to record metrics associated with the dialog layout, such as subsequent dialog rendering and submission timings, and compare those subsequently obtained metrics with the metrics that were originally used to determine that the dialog layout was optimal. In various implementations, a new optimal layout may be selected in response to detecting a change in the performance metrics associated with the optimal dialog layout selected at step 718. Therefore, if the metrics for the dialog layout that was previously identified as optimal become less than optimal, method 700 may restart to select a new optimal dialog layout.

For example, the analytics engine may continue to render the previously identified optimal dialog layout, and record the average time taken for the task workers to complete a task. The analytics engine may compare the recorded average against the least average time recorded during the previous submissions (e.g. when the dialog layout was selected as optimal). If the average time taken to complete the task for the dialog layout has increased, the efficiency of the dialog layout has likely decreased. In some instances, this may result from a group of task workers changing, or the content of the dialog changing. Thus, according to various implementations, the analytics engine may restart the dialog layout selection process by generating various configurations of the dialog layout and tracking data for each configuration.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method, comprising:
receiving, by a user interface (UI) optimizer executing on a computer, a request for optimization of a dialog layout utilized by an application, wherein the request includes a first unique identifier that identifies the dialog layout for optimization and a second unique identifier that identifies a task user who uses the dialog layout in a predetermined process implemented by the application;

retrieving, by the UI optimizer from a storage system utilizing the second unique identifier, context information associated with the request, wherein the context information identifies the task user's current state in the predetermined process and describes which user interface components should be included in the dialog layout based on the task user's current state in the predetermined process, wherein the context information further comprises historical information describing a sequence of previous tasks performed by the task user in the predetermined process to arrive at the task user's current task for the task user's current state in the predetermined process, the historical information identifying a subset of the user interface components accessed or modified during the sequence of previous tasks;

providing, by the UI optimizer, the context information to an analytics engine, wherein the analytics engine is operable to analyze the context information and determine dialog layout information which defines locations of the user interface components within a dialog and which defines relationships between the user interface components;

receiving, by the UI optimizer, the dialog layout information from the analytics engine, wherein the dialog layout information includes a third unique identifier that identifies a configuration of the user interface components included in the dialog layout;

retrieving, by the UI optimizer from a dialog library utilizing the third unique identifier, the dialog layout having the configuration;

rendering, by the UI optimizer, the retrieved dialog layout having the configuration; and providing, by the UI optimizer, the dynamically rendered dialog layout to a client machine for display to the task user.

2. The method according to claim 1, wherein the request is issued by an automated process associated with the application in response to detecting a particular task in a process taking longer than a threshold period of time, the particular task being associated with the dialog layout.

3. The method according to claim 1, wherein the request is issued periodically by an automated process associated with the application.

4. The method according to claim 1, wherein the predetermined process comprises a predetermined series of steps or tasks for handling a call from a customer, each step or task having an associated dialog.

5. The method according to claim 4, wherein the task user's current state identifies the task user's progress or location in the predetermined series of steps or tasks.

6. The method according to claim 4, wherein the set of tasks comprises at least one of: creating a new file for the customer, creating a new record for the customer's case, or reading an appropriate script for responding to the customer's inquiry.

7. The method according to claim 1, wherein the storage system stores unique identifiers of dialog layouts that have been optimized and wherein the analytics engine is operable to check whether the first unique identifier matches any of the unique identifiers.

8. A system, comprising:
a processor;
a non-transitory computer-readable medium; and
instructions stored on the non-transitory computer-readable medium and translatable by the processor for:

receiving a request for optimization of a dialog layout utilized by an application, wherein the request includes a first unique identifier that identifies the dialog layout for optimization and a second unique identifier that identifies a task user who uses the dialog layout in a predetermined process implemented by the application;

retrieving, from a storage system utilizing the second unique identifier, context information associated with the request, wherein the context information identifies the task user's current state in the predetermined process and describes which user interface components should be included in the dialog layout based on the task user's current state in the predetermined process, wherein the context information further comprises historical information describing a sequence of previous tasks performed by the task user in the predetermined process to arrive at the task user's current task for the task user's current state in the predetermined process, the historical information identifying a subset of the user interface components accessed or modified during the sequence of previous tasks;

providing the context information to an analytics engine, wherein the analytics engine is operable to analyze the context information and determine dialog layout information which defines locations of the user interface components within a dialog and which defines relationships between the user interface components in the dialog;

receiving the dialog layout information from the analytics engine, wherein the dialog layout information includes a third unique identifier that identifies a configuration of the user interface components included in the dialog layout;

retrieving, from a dialog library utilizing the third unique identifier, the dialog layout having the configuration;

rendering the retrieved dialog layout having the configuration; and providing the rendered dialog layout to a client machine for display to the task user.

9. The system of claim 8, wherein the request is issued by an automated process associated with the application in response to detecting a particular task in a process taking longer than a threshold period of time, the particular task being associated with the dialog layout.

10. The system of claim 8, wherein the request is issued periodically by an automated process associated with the application.

11. The system of claim 8, wherein the predetermined process comprises a predetermined series of steps or tasks for handling a call from a customer, each step or task having an associated dialog.

12. The system of claim 11, wherein the task user's current state identifies the task user's progress or location in the predetermined series of steps or tasks.

13. The system of claim 11, wherein the set of tasks comprises at least one of: creating a new file for the customer, creating a new record for the customer's case, or reading an appropriate script for responding to the customer's inquiry.

14. The system of claim 8, wherein the storage system stores unique identifiers of dialog layouts that have been optimized and wherein the analytics engine is operable to check whether the first unique identifier matches any of the unique identifiers.

15. A computer program product comprising a non-transitory computer-readable medium storing instructions translatable by a processor for:

receiving a request for optimization of a dialog layout utilized by an application, wherein the request includes a first unique identifier that identifies the dialog layout for optimization and a second unique identifier that identifies a task user who uses the dialog layout in a predetermined process implemented by the application;

retrieving, from a storage system utilizing the second unique identifier, context information associated with the request, wherein the context information identifies the task user's current state in the predetermined process and describes which user interface components should be included in the dialog layout based on the task user's current state in the predetermined process, wherein the context information further comprises historical information describing a sequence of previous tasks performed by the task user in the predetermined process to arrive at the task user's current task for the task user's current state in the predetermined process, the historical information identifying a subset of the user interface components accessed or modified during the sequence of previous tasks;

providing the context information to an analytics engine, wherein the analytics engine is operable to analyze the context information and determine dialog layout information which defines locations of the user interface components within a dialog and which defines relationships between the user interface components in the dialog;

receiving the dialog layout information from the analytics engine, wherein the dialog layout information includes a third unique identifier that identifies a configuration of the user interface components included in the dialog layout;

retrieving, from a dialog library utilizing the third unique identifier, the dialog layout having the configuration;

rendering the retrieved dialog layout having the configuration; and providing the rendered dialog layout to a client machine for display to the task user.

16. The computer program product of claim 15, wherein the request is issued by an automated process associated with the application in response to detecting a particular task in a process taking longer than a threshold period of time, the particular task being associated with the dialog layout.

17. The computer program product of claim 15, wherein the request is issued periodically by an automated process associated with the application.

18. The computer program product of claim 15, wherein the predetermined process comprises a predetermined series of steps or tasks for handling a call from a customer, each step or task having an associated dialog.

19. The computer program product of claim 18, wherein the task user's current state identifies the task user's progress or location in the predetermined series of steps or tasks.

20. The computer program product of claim 15, wherein the storage system stores unique identifiers of dialog layouts that have been optimized and wherein the analytics engine is operable to check whether the first unique identifier matches any of the unique identifiers.

* * * * *